H. T. FARNSWORTH.
WATER MOTOR.
APPLICATION FILED FEB. 9, 1909.
955,148.
Patented Apr. 19, 1910.
2 SHEETS—SHEET 1.
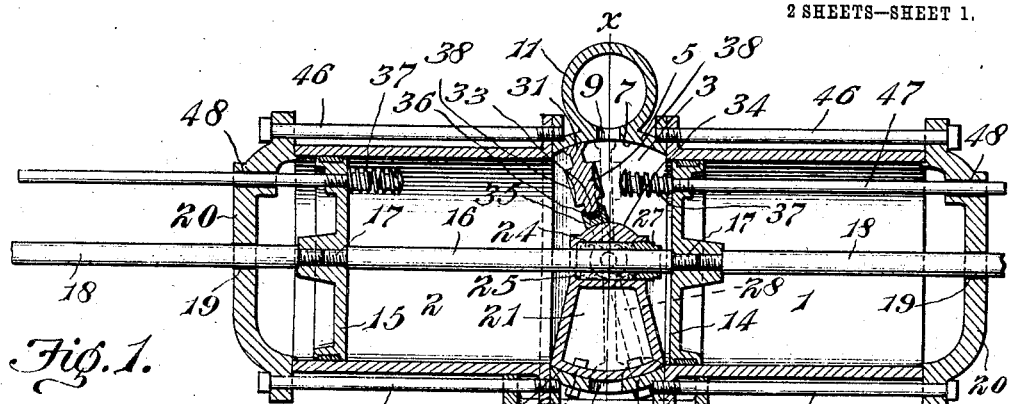
Fig. 1.
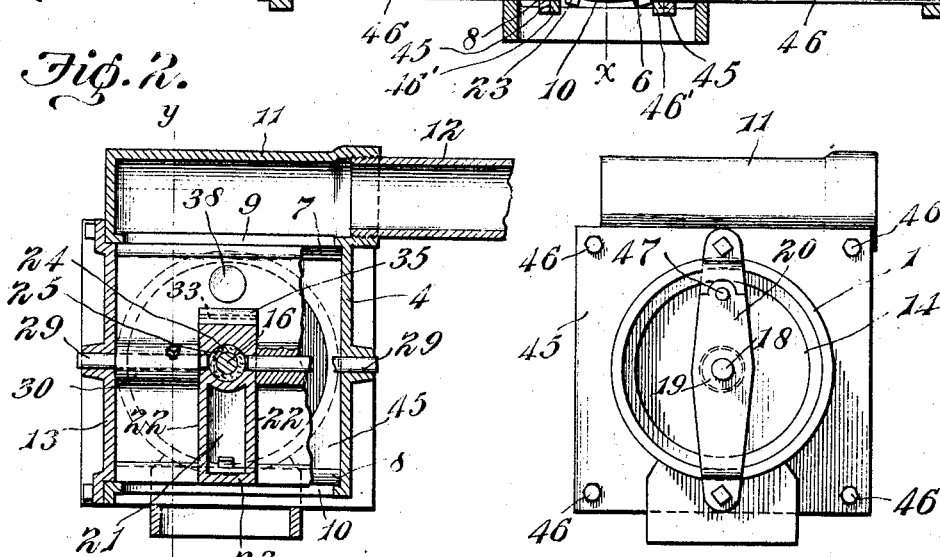
Fig. 2.
Fig. 3.
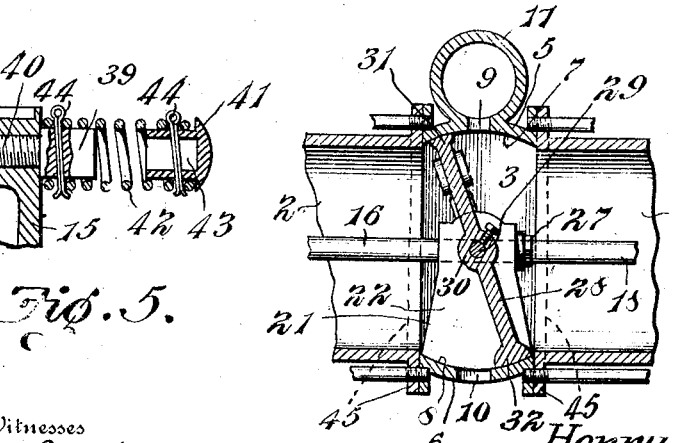
Fig. 5.
Fig. 4.
Witnesses
M. R. Alford
J. H. Bishop
Inventor,
Henry T. Farnsworth.
By Joshua R. H. Potts
Attorney

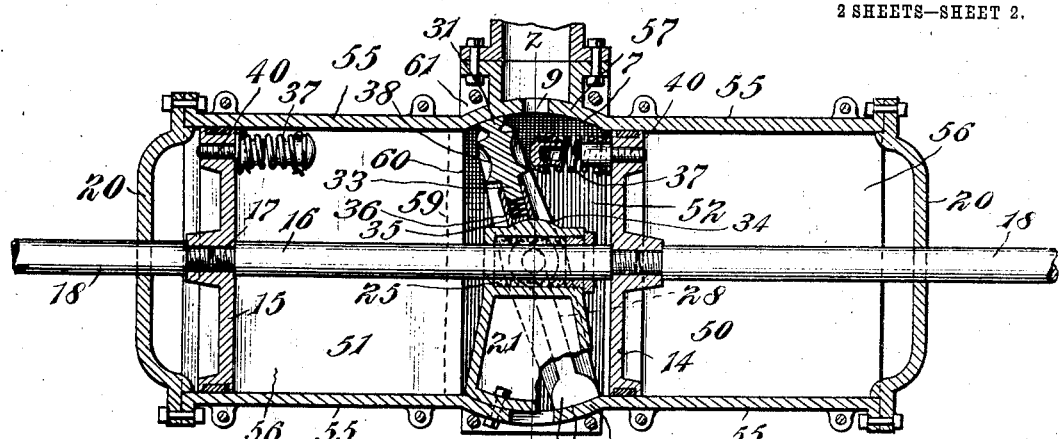
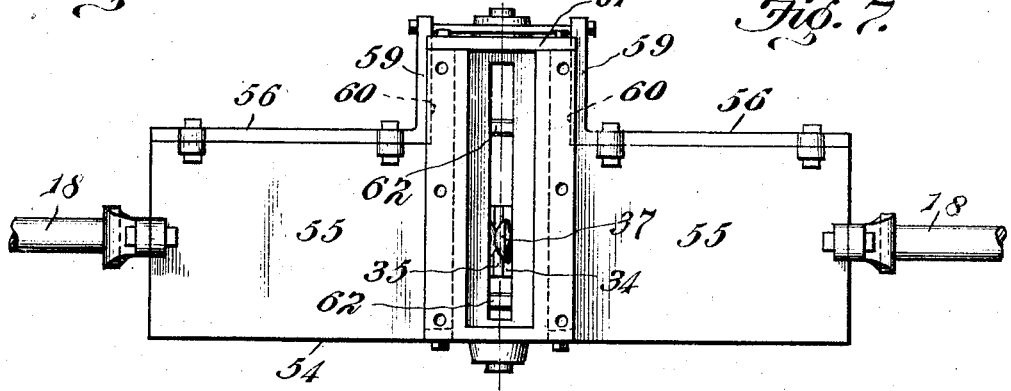
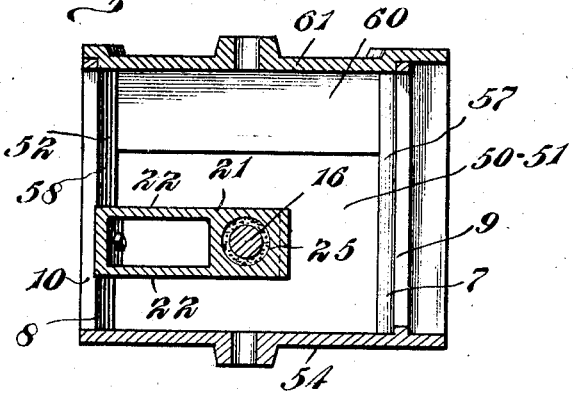
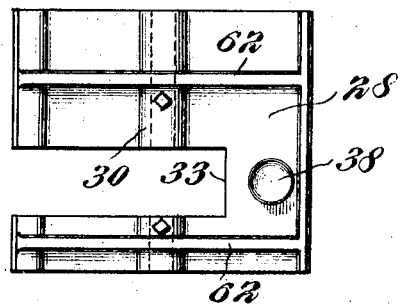

UNITED STATES PATENT OFFICE.

HENRY T. FARNSWORTH, OF GLADE SPRING, VIRGINIA.

WATER-MOTOR.

955,148. Specification of Letters Patent. Patented Apr. 19, 1910.

Application filed February 9, 1909. Serial No. 476,940.

*To all whom it may concern:*

Be it known that I, HENRY T. FARNSWORTH, a citizen of the United States, residing at Glade Spring, county of Washington, and State of Virginia, have invented certain new and useful Improvements in Water-Motors, of which the following is a specification.

My invention relates to water motors, that is to engines or motors driven by water power.

The object of my invention is to provide an improved water motor adapted to drive stationary machinery of almost any description and which shall be actuated by the pressure due to the head of the body of water.

Further object of my invention is to provide a water motor as mentioned which shall have a reciprocatory motion and which shall be driven positively in both directions.

A further object of my invention is to provide a motor characterized as above having but one valve which shall be operated by the piston at the end of each stroke.

A further object of my invention is to provide a device as mentioned which shall be compact, simple of construction, of great strength and durability and of low cost to manufacture.

Other objects will appear hereinafter.

My invention will be more readily understood by reference to the accompanying drawings forming a part of this specification and in which, Figure 1 is a vertical longitudinal section through a water motor embodying my invention, Fig. 2 is a transverse vertical section taken substantially on the line $x$—$x$ of Fig. 1, the valve being partially broken away, Fig. 3 is an end elevation of the motor, Fig. 4 is a detail vertical longitudinal section on the line $y$—$y$ of Fig. 2, Fig. 5 is an enlarged detail view of the valve operating device which is arranged upon each of the pistons, Fig. 6 is a horizontal longitudinal section through a modified form of the motor wherein the device is provided with square piston chambers, Fig. 7 is a side elevation of the motor illustrated in Fig. 6, showing the inlet port, Fig. 8 is a transverse section through the valve chamber taken on the line $z$—$z$ of Fig. 7, and Fig. 9 is a detail view of the valve.

Referring now to Figs. 1 to 5 inclusive of the drawings, 1 and 2 indicate similar piston chambers. These are arranged in axial alinement with each other and as shown in the drawings are cylindrical in form. Arranged between the chambers 1 and 2 is the valve chamber 3. In this form of the device the chambers 1, 2 and 3 are each formed of a separate casting, and the latter comprises a vertical side wall 4 and the curved top and bottom walls 5 and 6 respectively, the inner faces of which constitute valve seats 7 and 8. The walls 5 and 6 are provided with the inlet and exhaust ports 9 and 10 respectively, which extend substantially the full width of the walls transversely of the device, and cast integrally with the valve chamber is a water supply chamber 11, which is connected in any suitable manner, as by a pipe 12, to the source of water supply. The side of the valve chamber opposite the wall 4 is provided with a closure 13 which is removable to afford access to the chamber for the purpose of assembling the device and repairing the same.

14 and 15 indicate the pistons which are arranged in the chambers 1 and 2 respectively. These are rigidly connected by a rod 16, the ends of said rod being reduced and threaded into said pistons as at 17.

18 indicate the piston rods which are connected to the pistons and extend outwardly through guides 19 in yokes 20 which are secured to the ends of the piston chambers. One or both of the rods 18 may be connected to the machinery to be driven.

Arranged in the valve chamber is a division post 21. This comprises a casting having parallel side walls 22—22 and a curved end wall 23 which fits upon the curved wall 6 to which it is bolted or otherwise suitably secured. The inner end of the post 21 is provided with a gland 24 through which the rod 16 extends and the gland is provided with packing 25 and a nut 27 forming a watertight joint. The post 21 is comparatively narrow in order that it shall not interfere or reduce materially the area of the exhaust.

28 indicates the valve which is pivotally mounted on a transverse, preferably central axis which consists in shafts 29 having bearings in the walls 4 and 13 and the post 21. The valve is cut away or bifurcated to receive the post 21 and its outer edges fit snugly against the walls 4 and 13 and the edges of the cut away portion fit snugly against the walls 22 of the post. By this arrangement the valve has a greater area above the line of its axis than below the same, for a purpose which will be described hereinafter. The valve comprises generally a flat plate, enlarged on its central axis as at 30 and bored to receive the shafts 29, and enlarged at the ends 31 and 32 to form the inlet and exhaust valves proper. The ends 31 and 32 fit snugly against the valve seats 7 and 8 at all times and to this end the walls 5 and 6 are curved with the shafts 29 or axis of the valve plate as a center. The axis of the valve plate 28 is arranged parallel with and directly between the inlet and exhaust ports, so that when the valve plate is inclined in one direction the inlet port is thrown into communication with one of the piston chambers and the exhaust port with the opposite piston chamber. The valve plate is cut away so that its edge 33 is some distance above the end of the post 21 and the adjacent edge of the post is provided with a curved or cylindrical face 34 between which and the edge 33 is interposed a block 35. The upper edge of the block 35 is grooved as at 36 to receive the edge 33 of the valve plate and a spring or springs are interposed between the block and said edge to hold the latter in contact with the face 34. The surface 34 is curved with the axis of the valve plate as a center.

In Fig. 1 I have illustrated piston 14 at the end of its inward stroke and ready to begin the return stroke. The valve plate has been thrown so as to bring the port 9 into communication with the chamber 1 and the port 10 into communication with the chamber 2. As the water flows in through the port 9 it will force the piston 14 outwardly, drawing the piston 15 inwardly and exhausting the water in the chamber 2 through the port 10. As there is a greater area to the valve plate above its axis than below the same, it is obvious that the pressure of water in the valve chamber between the plate and the piston will maintain the former in the position shown in full lines in Fig. 1, with the ports wide open. The exhaust port 10 is of greater area than the inlet port 9 hence there is less pressure behind the valve plate than in front of the same.

Each of the pistons is provided with means for actuating or shifting the valve plate at the end of each stroke. These comprise buffers 37 which engage bosses 38 formed upon opposite sides of the valve plate 28 and directly above or beyond the end of the post 21. Each buffer consists of a pin 39 having a threaded shank 40 by which it is secured to the piston, a head 41, and a spring 42 interposed between the same and holding the head normally at a short distance from the pin 39. The ends of the spring 42 surround the pin 39 and the shank 43 of the head and are held in position by cotter pins 44 as clearly shown in Fig. 5. As the piston approaches the end of its stroke the head 41 engages its respective boss 38, which is formed concave to receive the same, said head being convex. With further movement of the piston the spring 42 is compressed until the shank 43 engages the end of the pin 39 after which further movement will shift the valve plate until the inlet valve 31 is moved past the port 9 a sufficient distance to permit the water to begin to flow into the opposite piston chamber. As the pressure increases with the influx of water the valve plate is further thrown to the limit of its movement, opening the exhaust port. The inlet valve and the inlet port are of the same width whereas the exhaust valve 32 is somewhat greater in width than the exhaust port, permitting a slight lap. By this construction the stroke of the valve and the stroke of the pistons are cushioned.

The inner ends of the piston chambers are each provided with a rectangular flange 45 which form the end walls of the valve chamber and which constitute stops against which the lower end of the valve plate abuts at the end of its stroke to limit its movement. Bolts 46 passing through the ends of the yokes 20, the flanges 45, and flanges 46 on the chamber casting 3 securely fasten the parts together. To prevent rotation of the pistons in their respective chambers the stem 40 of the pins 39 are extended forming rods 47 having bearings 48 in the yokes 20.

In Figs. 6 to 9 inclusive I have illustrated a motor embodying a slight modification of my invention wherein the valve chamber and the piston chambers are formed of one casting. In this form of the device the piston chambers are formed rectangular in cross section so that the boring tool with which the valve seats 7 and 8 are finished may make a complete revolution. Referring now to said figures 50 and 51 indicate the piston chambers and 52 the valve chamber formed integrally therewith, having a common or continuous bottom wall 54. The side walls 55 of the piston chambers are cast integrally with the bottom wall but the top walls 56 constitute separate removable plates. The side walls 57—58 of the valve chamber are curved to form the valve seats 7 and 8 respectively and are extended upwardly beyond the top of the walls 55 to increase the size of the valve chamber and the ports so that the latter may be of sufficient size without necessitating a large valve movement. The inner ends of the top plates 56 are turned upwardly as at 59 forming side walls 60 for the valve chamber and constituting stops against which the end of the valve abuts. The upper end of the valve chamber is closed by a horizontal plate 61. With the exception of the above noted differences and the fact that the ports are upon the sides of the valve chamber and that the valve swings upon a vertical instead of upon a horizontal axis the construction and operation are practically the same as in the preceding modification.

It is obvious that as the pistons and piston chambers are rectangular, the rods 47 may be dispensed with, and in large sized machines the valve plate may be provided with strengthening ribs 62.

Having described my invention what I claim as new and desire to secure by Letters Patent is:

1. A water motor comprising a pair of piston chambers in axial alinement with each other and a valve chamber arranged between the same, in combination with a piston arranged in each of said piston chambers and a valve arranged in said valve chamber and adapted to swing on a transverse axis, the walls of said valve chamber adjacent to the ends of said valve being curved with the axis of the valve as a center and provided with an inlet and an outlet port respectively, the end of said valve adjacent said inlet port being substantially coextensive in area therewith and the end of the valve adjacent said outlet port being of greater area than said port, and means for swinging said valve with each stroke of the pistons, substantially as described.

2. A water motor comprising a pair of piston chambers arranged in axial alinement and a valve chamber arranged between the same, in combination with a piston arranged in each of said piston chambers, a member arranged in said valve chamber and extending inwardly from one wall thereof, a valve arranged in said valve chamber and slotted to receive said member, said valve being arranged to swing upon a transverse axis and said valve chamber being provided with an exhaust port adjacent to the base of said member and an inlet port diametrically opposite therefrom, substantially as described.

3. A water motor comprising a pair of piston chambers and a valve chamber arranged between the same, in combination with a piston arranged in each of said piston chambers, a member arranged in said valve chamber and extending inwardly from one wall thereof, a valve arranged in said valve chamber and slotted to receive said member, said valve being arranged to swing upon a transverse axis, the inner end of said member being curved with the axis of rotation of said valve as a center, a block interposed between said curved end and the adjacent edge of said valve and grooved to receive said edge and springs interposed between said block and said edge, substantially as described.

4. In a water motor a pair of piston chambers arranged in axial alinement and each formed of a separate casting, and a valve chamber formed of a separate casting and arranged between the same, said valve chamber comprising a pair of curved walls and an integral side wall connecting the same and a removable closure forming the opposite side wall, in combination with a valve arranged in said valve chamber and a piston arranged in each of said piston chambers, substantially as described.

5. A water motor comprising a pair of piston chambers arranged in axial alinement and a valve chamber arranged between the same, in combination with a piston arranged in each of said piston chambers, a member arranged in said valve chamber and extending inwardly from one wall thereof, a valve arranged in said valve chamber and slotted to receive said member, said valve being arranged to swing upon a transverse axis, a rod connecting said pistons and extending through said member and a stuffing box formed in said member for said rod, substantially as described.

6. A water motor comprising a pair of piston chambers arranged in axial alinement and a valve chamber arranged between the same in combination with a piston arranged in each of said piston chambers, a valve arranged in said valve chamber, a piston rod extending from each of said pistons, an eccentrically arranged rod extending from each of said pistons and parallel with the piston rod, and means fixed to the ends of the respective piston chambers and constituting guides for the last said rods, substantially as described.

In testimony whereof I have signed my name to this specification in the presence of two subscribing witnesses.

HENRY T. FARNSWORTH.

Witnesses:
W. T. MARILLA,
E. M. ABBOTT.